US010525861B2

(12) United States Patent
Line et al.

(10) Patent No.: US 10,525,861 B2
(45) Date of Patent: Jan. 7, 2020

(54) LEG SUPPORT OPTIONS FOR SLEEPER SEATS

(71) Applicant: Ford Global Technologies, LLC, Dearborn, MI (US)

(72) Inventors: Johnathan Andrew Line, Northville, MI (US); Marcos Silva Kondrad, Macomb, MI (US); Kevin Wayne Preuss, Berkley, MI (US); Keith Allen Godin, Dearborn, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/465,749

(22) Filed: Mar. 22, 2017

(65) Prior Publication Data

US 2018/0272904 A1   Sep. 27, 2018

(51) Int. Cl.
| | | |
|---|---|---|
| *B60N 2/22* | (2006.01) | |
| *B60N 2/90* | (2018.01) | |
| *B60N 2/34* | (2006.01) | |
| *B60N 2/02* | (2006.01) | |

(52) U.S. Cl.
CPC ............ *B60N 2/995* (2018.02); *B60N 2/0232* (2013.01); *B60N 2/22* (2013.01); *B60N 2/34* (2013.01); *B60N 2/914* (2018.02); *B60N 2002/0236* (2013.01)

(58) Field of Classification Search
CPC ........ B60N 2/995; B60N 2/0232; B60N 2/34; B60N 2/914; B60N 2/22; B60N 2002/0236; A47C 1/031; A47C 1/035; A47C 1/034; A47C 7/50

USPC ............ 297/423.34, 423.35, 423.23, 423.24, 297/423.19
See application file for complete search history.

(56) References Cited

U.S. PATENT DOCUMENTS

| | | | |
|---|---|---|---|
| 2,576,343 | A | 11/1951 | Hibbard et al. |
| 2,797,739 | A | 7/1957 | Orsini |
| 3,451,261 | A | 6/1969 | Olsen |
| 4,106,081 | A | 8/1978 | Turturici |
| 4,272,119 | A | 6/1981 | Adams |

(Continued)

FOREIGN PATENT DOCUMENTS

| | | |
|---|---|---|
| DE | 19901072 C1 | 3/2000 |
| DE | 102005023602 A1 | 11/2006 |

(Continued)

OTHER PUBLICATIONS

Machine translation of foreign reference DE 102006045206, obtained from http://translationportal.epo.org/emtp/translate/?ACTION=description-retrieval&COUNTRY=DE&ENGINE=google&FORMAT=docdb&KIND=A1&LOCALE=en_EP&NUMBER=102006045206&OPS=ops.epo.org/3.2&SRCLANG=de&TRGLANG=en (last accessed on Apr. 10, 2018) (Year: 2018).*

*Primary Examiner* — Theodore V Adamos
(74) *Attorney, Agent, or Firm* — Vichit Chea; Price Heneveld LLP (57) ABSTRACT

A seating assembly includes a seat operably coupled with a seatback. A calf support is rotatably coupled with the seat. A first motor is proximate the calf support and rotates the calf support outward approximately 90 degrees from a design position to a deployed position. An extension telescopingly engages with the calf support. A second motor is operably coupled with the extension and is configured to move the extension outward.

7 Claims, 5 Drawing Sheets

(56) References Cited

U.S. PATENT DOCUMENTS

| | | |
|---|---|---|
| 4,506,317 A | 3/1985 | Duddy |
| 4,626,028 A | 12/1986 | Hatsutta et al. |
| 4,709,961 A | 12/1987 | Hill |
| 4,809,897 A | 3/1989 | Wright, Jr. |
| 4,832,400 A | 5/1989 | Aoki et al. |
| 4,955,571 A | 9/1990 | Lorence et al. |
| 4,977,973 A | 12/1990 | Takizawa |
| 5,011,225 A | 4/1991 | Nemoto |
| 5,011,226 A | 4/1991 | Ikeda et al. |
| 5,046,433 A | 9/1991 | Kramer et al. |
| 5,058,953 A | 10/1991 | Takagi et al. |
| 5,092,507 A | 3/1992 | Szablak et al. |
| 5,145,233 A | 9/1992 | Nagashima |
| 5,297,010 A | 3/1994 | Camarota et al. |
| 5,297,021 A * | 3/1994 | Koerlin ............... A61G 5/1067 180/907 |
| 5,364,164 A | 11/1994 | Kuranami |
| 5,370,035 A | 12/1994 | Madden, Jr. |
| 5,511,842 A | 4/1996 | Dillon |
| 5,521,806 A | 5/1996 | Hutzel et al. |
| 5,565,153 A | 10/1996 | Chidlaw et al. |
| 5,567,011 A | 10/1996 | Sessini |
| 5,732,994 A | 3/1998 | Stancu et al. |
| 5,836,648 A | 11/1998 | Karschin et al. |
| 5,845,965 A | 12/1998 | Heath et al. |
| 6,015,198 A | 1/2000 | Stair |
| 6,032,587 A | 3/2000 | Salenbauch et al. |
| 6,090,148 A | 7/2000 | Weber et al. |
| 6,096,086 A | 8/2000 | Weber et al. |
| 6,110,216 A | 8/2000 | Weber et al. |
| 6,123,377 A | 9/2000 | Lecher et al. |
| 6,135,558 A | 10/2000 | Behrens et al. |
| 6,135,561 A | 10/2000 | Kruger et al. |
| 6,183,033 B1 | 2/2001 | Arai et al. |
| 6,213,549 B1 | 4/2001 | Wieclawski |
| 6,220,660 B1 | 4/2001 | Bedro et al. |
| 6,273,511 B1 | 8/2001 | Wieclawski |
| 6,347,590 B1 | 2/2002 | D'Annunzio et al. |
| 6,419,314 B1 | 7/2002 | Scheerhorn |
| 6,439,636 B1 | 8/2002 | Kuo |
| 6,478,373 B1 | 11/2002 | Hake et al. |
| 6,547,323 B1 | 4/2003 | Aitken et al. |
| 6,565,150 B2 | 5/2003 | Fischer et al. |
| 6,601,901 B1 | 8/2003 | Schambre et al. |
| 6,690,268 B2 | 2/2004 | Schofield et al. |
| 6,719,343 B2 | 4/2004 | Emerling et al. |
| 6,719,367 B2 | 4/2004 | Mic et al. |
| 6,719,368 B1 | 4/2004 | Neale |
| 6,746,065 B1 | 6/2004 | Chan |
| 6,761,388 B2 | 7/2004 | Lein et al. |
| 6,848,817 B2 | 2/2005 | Bos et al. |
| 7,021,694 B1 | 4/2006 | Roberts et al. |
| 7,025,420 B2 | 4/2006 | Guinea Pena et al. |
| 7,055,904 B2 | 6/2006 | Skelly et al. |
| 7,077,472 B2 | 7/2006 | Steffens, Jr. |
| 7,080,865 B2 | 7/2006 | Bergeron et al. |
| 7,114,755 B1 | 10/2006 | Sturt et al. |
| 7,192,070 B2 | 3/2007 | Radu et al. |
| 7,270,452 B2 | 9/2007 | Wang |
| 7,278,681 B2 | 10/2007 | Lilov et al. |
| 7,293,507 B2 | 11/2007 | Depue et al. |
| 7,296,839 B2 | 11/2007 | Scheerhorn |
| 7,322,646 B2 | 1/2008 | Jammalamadaka et al. |
| 7,328,818 B2 | 2/2008 | Prabucki |
| 7,364,231 B2 | 4/2008 | Park et al. |
| 7,393,052 B2 | 7/2008 | Humer et al. |
| 7,431,365 B2 | 10/2008 | Sturt et al. |
| 7,441,838 B2 | 10/2008 | Patwardhan |
| 7,455,016 B2 | 11/2008 | Perin |
| 7,520,552 B2 | 4/2009 | Nakamura et al. |
| 7,523,888 B2 | 4/2009 | Ferry et al. |
| 7,537,364 B2 | 5/2009 | Misawa et al. |
| 7,641,252 B2 | 1/2010 | Sturt et al. |
| 7,644,982 B2 | 1/2010 | Paluch |
| 7,748,762 B2 | 7/2010 | Mayne, Jr. |
| 7,770,953 B2 | 8/2010 | Koarai |
| 7,793,597 B2 | 9/2010 | Bart et al. |
| 7,798,072 B2 | 9/2010 | Becker et al. |
| 7,834,750 B1 | 11/2010 | Hertz et al. |
| 7,845,729 B2 | 12/2010 | Yamada et al. |
| 7,857,381 B2 | 12/2010 | Humer et al. |
| 7,934,762 B2 | 5/2011 | Hollenbeck et al. |
| 8,002,323 B2 | 8/2011 | Jones et al. |
| 8,033,610 B2 | 10/2011 | Graber et al. |
| 8,052,194 B2 | 11/2011 | Sayama |
| 8,104,836 B2 | 1/2012 | Little |
| 8,109,565 B2 | 2/2012 | Waters et al. |
| 8,141,930 B2 | 3/2012 | Sayama |
| 8,167,366 B2 | 5/2012 | Charpentier et al. |
| 8,177,281 B2 | 5/2012 | Sayama |
| 8,201,890 B1 | 6/2012 | Nagoaka Mihara |
| 8,262,164 B2 | 9/2012 | Ito et al. |
| 8,287,024 B2 | 10/2012 | Sayama |
| 8,287,037 B2 | 10/2012 | Sayama |
| 8,336,955 B2 | 12/2012 | Sayama |
| 8,388,054 B2 | 3/2013 | Sayama |
| 8,397,963 B2 | 3/2013 | Singh |
| 8,421,407 B2 | 4/2013 | Johnson |
| 8,496,295 B2 | 7/2013 | Chen |
| 8,528,978 B2 | 9/2013 | Purpura et al. |
| 8,534,750 B2 | 9/2013 | Sayama |
| 8,540,308 B2 | 9/2013 | Aoki et al. |
| 8,899,683 B2 | 12/2014 | Ito |
| 8,998,327 B2 | 4/2015 | Cooney |
| 9,105,809 B2 | 8/2015 | Lofy |
| 9,150,152 B2 | 10/2015 | Sura et al. |
| 9,168,850 B2 | 10/2015 | Meszaros et al. |
| 9,187,019 B2 | 11/2015 | Dry et al. |
| 9,205,774 B2 | 12/2015 | Kennemer et al. |
| 9,399,418 B2 | 7/2016 | Line et al. |
| 9,421,894 B2 | 8/2016 | Line et al. |
| 9,452,838 B2 | 9/2016 | Meister et al. |
| 9,526,343 B1 * | 12/2016 | Wu ....................... A47C 7/506 |
| 9,566,888 B2 | 2/2017 | Kolich et al. |
| 9,573,502 B2 | 2/2017 | Seki et al. |
| 9,596,940 B2 | 3/2017 | Petzel et al. |
| 9,610,872 B2 | 4/2017 | Dry et al. |
| 9,649,962 B2 | 5/2017 | Line et al. |
| 2001/0022461 A1 * | 9/2001 | Marcantoni ............ A47C 7/506 297/423.36 |
| 2001/0033101 A1 * | 10/2001 | Plant .................... A47C 1/0352 297/342 |
| 2002/0003370 A1 * | 1/2002 | Menard ................ B60N 2/0232 297/423.36 |
| 2002/0063449 A1 * | 5/2002 | Plant ...................... B60N 2/34 297/68 |
| 2002/0113477 A1 * | 8/2002 | Uchiyama ............ A47C 1/0242 297/330 |
| 2003/0209933 A1 * | 11/2003 | Flory .................... B60N 2/995 297/423.36 |
| 2004/0012234 A1 | 1/2004 | Yamaguchi et al. |
| 2004/0070240 A1 | 4/2004 | Haland et al. |
| 2005/0120477 A1 | 6/2005 | Kennan |
| 2005/0173963 A1 * | 8/2005 | Edrich .................... B60N 2/62 297/423.28 |
| 2005/0184575 A1 * | 8/2005 | Baumann ............... B64D 11/06 297/423.19 |
| 2005/0225145 A1 | 10/2005 | Furtado et al. |
| 2005/0280296 A1 | 12/2005 | Ohchi et al. |
| 2006/0001297 A1 * | 1/2006 | Chang .................... A47C 1/035 297/75 |
| 2006/0006709 A1 | 1/2006 | Uno et al. |
| 2006/0071517 A1 | 4/2006 | Humer et al. |
| 2006/0100764 A1 | 5/2006 | Adams et al. |
| 2006/0202524 A1 | 9/2006 | Yamaguchi |
| 2006/0202525 A1 | 9/2006 | Yamaguchi |
| 2006/0208517 A1 | 9/2006 | Nakamura et al. |
| 2007/0170281 A1 | 7/2007 | Cooper et al. |
| 2007/0205622 A1 | 9/2007 | Whitens et al. |
| 2008/0012402 A1 | 1/2008 | Sekida |
| 2008/0073950 A1 | 3/2008 | Ko |
| 2008/0084098 A1 | 4/2008 | Humer et al. |
| 2008/0088158 A1 | 4/2008 | Yokota et al. |

(56) References Cited

U.S. PATENT DOCUMENTS

| | | |
|---|---|---|
| 2008/0110931 A1 | 5/2008 | Prabucki |
| 2008/0129093 A1 | 6/2008 | Kim |
| 2008/0231067 A1 | 9/2008 | Nagle |
| 2009/0167066 A1 | 7/2009 | Mori et al. |
| 2009/0174206 A1 | 7/2009 | Vander Sluis et al. |
| 2009/0309398 A1 | 12/2009 | Niitsuma et al. |
| 2010/0026060 A1 | 2/2010 | Niitsuma et al. |
| 2010/0026066 A1* | 2/2010 | Graber .................. B60N 2/0232 297/284.1 |
| 2010/0066135 A1 | 3/2010 | Humer et al. |
| 2010/0066136 A1 | 3/2010 | D'Agostini |
| 2010/0090505 A1 | 4/2010 | Tarusawa et al. |
| 2010/0127540 A1 | 5/2010 | Park et al. |
| 2010/0148545 A1 | 6/2010 | Omori |
| 2010/0187875 A1 | 7/2010 | Sasaki et al. |
| 2010/0201167 A1 | 8/2010 | Wieclawski |
| 2010/0207414 A1 | 8/2010 | Tsuda et al. |
| 2010/0244478 A1 | 9/2010 | Depue |
| 2010/0244534 A1* | 9/2010 | Driessen .............. B60N 2/4495 297/423.35 |
| 2010/0264704 A1 | 10/2010 | Yasuda et al. |
| 2010/0270834 A1 | 10/2010 | Niitsuma |
| 2010/0270835 A1 | 10/2010 | Nitsuma |
| 2010/0295348 A1 | 11/2010 | Takayasu et al. |
| 2010/0308629 A1 | 12/2010 | Lee et al. |
| 2011/0187167 A1 | 8/2011 | Takayasu et al. |
| 2011/0240797 A1* | 10/2011 | Behe ....................... B64D 11/06 244/122 R |
| 2011/0272978 A1 | 11/2011 | Nitsuma |
| 2012/0068517 A1 | 3/2012 | Yetukuri et al. |
| 2012/0091779 A1* | 4/2012 | Chang .................... B60N 2/995 297/423.3 |
| 2012/0198616 A1 | 8/2012 | Makansi et al. |
| 2012/0212016 A1 | 8/2012 | Kanda |
| 2013/0153055 A1 | 6/2013 | Gaffoglio |
| 2013/0313882 A1* | 11/2013 | Yin ........................ A47C 7/506 297/423.22 |
| 2014/0203615 A1 | 7/2014 | Little |
| 2014/0368015 A1 | 12/2014 | Basters et al. |
| 2015/0283931 A1* | 10/2015 | Line ........................ B60N 2/62 297/423.19 |
| 2015/0375640 A1* | 12/2015 | Yin ........................ B60N 2/206 297/157.1 |
| 2016/0082870 A1* | 3/2016 | Fujita .................... B60N 2/501 248/561 |
| 2016/0331609 A1* | 11/2016 | Cheng ................... B60N 3/063 |
| 2016/0355114 A1 | 12/2016 | Line et al. |

FOREIGN PATENT DOCUMENTS

| | | | | |
|---|---|---|---|---|
| DE | 102006045206 A1 * | 4/2008 | ............ | B60N 2/995 |
| EP | 2769904 A1 | 8/2014 | | |
| FR | 2833220 A | 10/1938 | | |
| FR | 2698594 A1 | 6/1994 | | |
| JP | 775608 | 3/1995 | | |
| JP | H0775608 A | 3/1995 | | |
| WO | 2006067460 A1 | 6/2006 | | |
| WO | 2010144420 A1 | 12/2010 | | |
| WO | 2016070052 A1 | 5/2016 | | |

* cited by examiner

LEG SUPPORT OPTIONS FOR SLEEPER SEATS

FIELD OF THE DISCLOSURE

The present disclosure generally relates to a leg support for a seating assembly, and more particularly to a leg support with options for sleeper seats in a seating assembly.

BACKGROUND OF THE DISCLOSURE

Seating assemblies and the flexible nature of those seating assemblies is becoming more important in today's world. The value of having an adjustable seating assembly provides increased worktime and increased comfort to an individual. Some seating assemblies include upper thoracic support that is adjustable between forward and rearward positions. Providing an aesthetically pleasing upper back support that is consistent with and generally seamless with the remainder of the seat provides value to the consumer.

SUMMARY OF THE DISCLOSURE

According to one aspect of the present disclosure, a seating assembly includes a seat operably coupled with a seatback. A calf support is rotatably coupled with the seat. A first motor is proximate the calf support and rotates the calf support outward approximately 90 degrees from a design position to a deployed position. An extension telescopingly engages with the calf support. A second motor is operably coupled with the extension and is configured to move the extension outward.

According to another aspect of the present disclosure, a seating assembly includes a seating assembly. A seat is operably coupled with a seatback. A calf support is rotatably coupled with the seat. A first motor is disposed under the seat, behind the calf support and rotates the calf support outward from a design position to a deployed position. An extendable support is configured to move linearly relative to the calf support. A second motor is operably coupled with the extendable support and is configured to move the extendable support outward automatically as the calf support moves to the deployed position.

According to yet another aspect of the present disclosure, a seating assembly includes a seat operably coupled with a seatback. A calf support is rotatably coupled with the seat. A bladder is disposed under the seat, behind the calf support and rotates the calf support outward from a design position to a deployed position. An extendable support is configured to move linearly relative to the calf support. A bladder is operably coupled with the extendable support and is configured to move the extendable support outward automatically as the calf support moves to the deployed position.

Embodiments of the first aspect of the invention can include any one or a combination of the following features:
- an extension includes a width approximately equal to a width of a seat;
- the extension moves in concert with a rear H-point pivot of the seat;
- a calf support is slidably coupled with side sliders;
- the calf support is pivotally coupled with a cushion pan of the seat; and
- the extension telescopes outwardly automatically as the calf support rotates upward.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
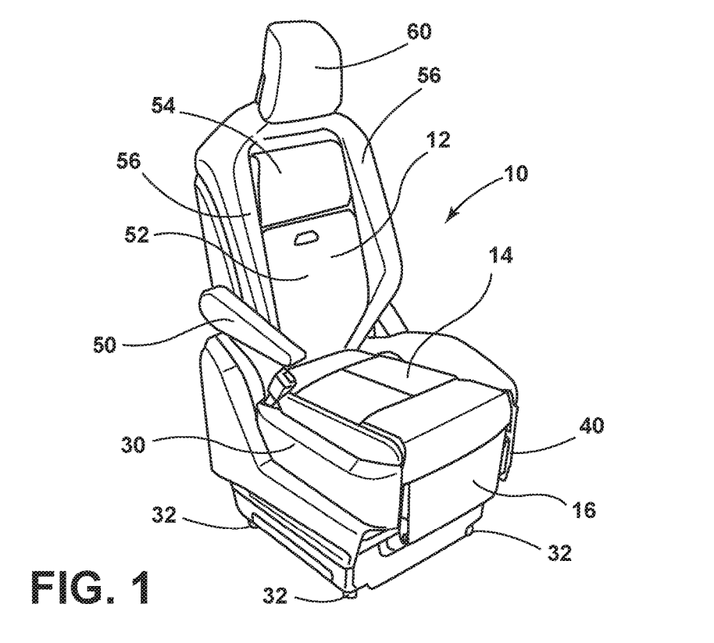
FIG. 1 is a front perspective view of a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
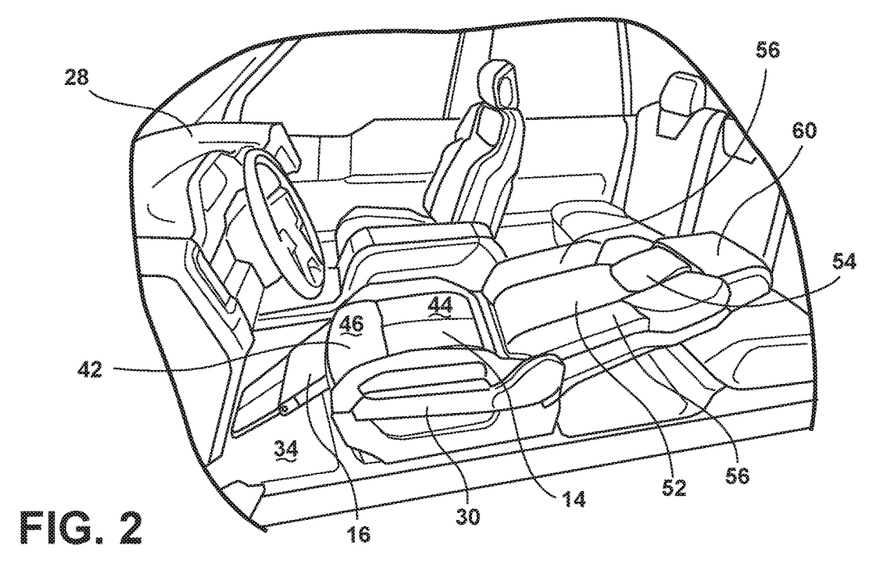
FIG. 2 is a front perspective view of a seating assembly of the present disclosure disposed inside a vehicle and in a reclined position.
Figure 3:
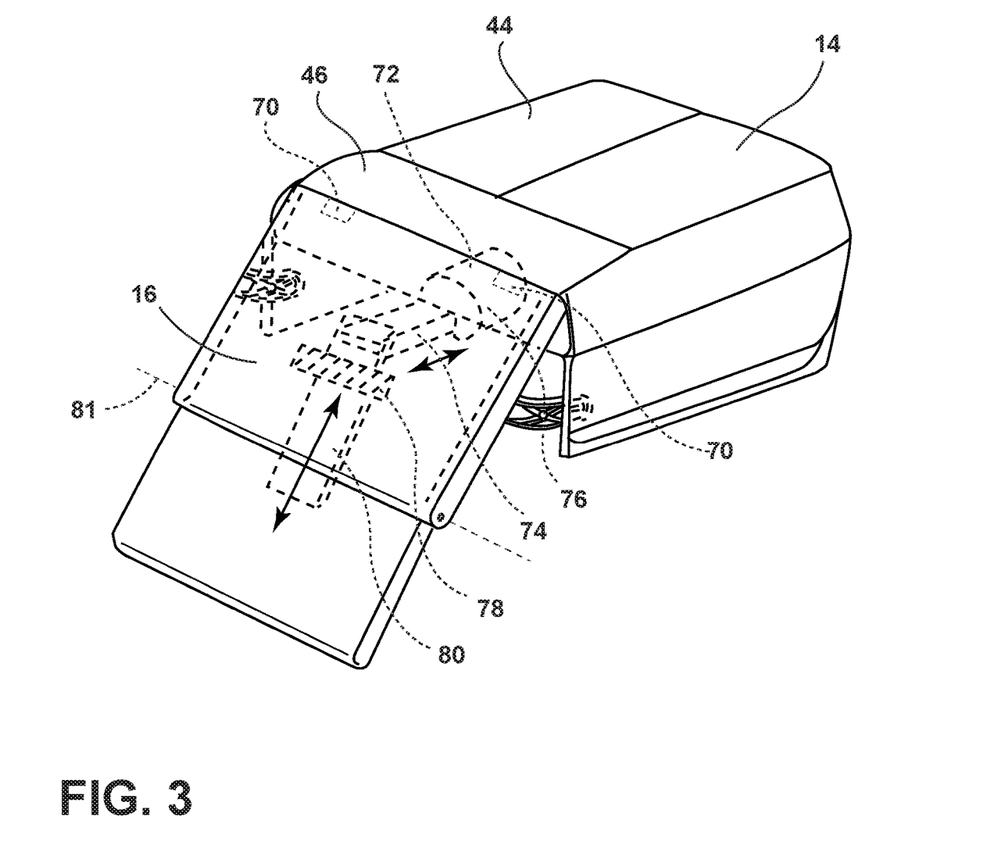
FIG. 3 is an enlarged front perspective view of a calf support of the seat of FIG. 1 with a calf support and extension in an extended position.
Figure 4:
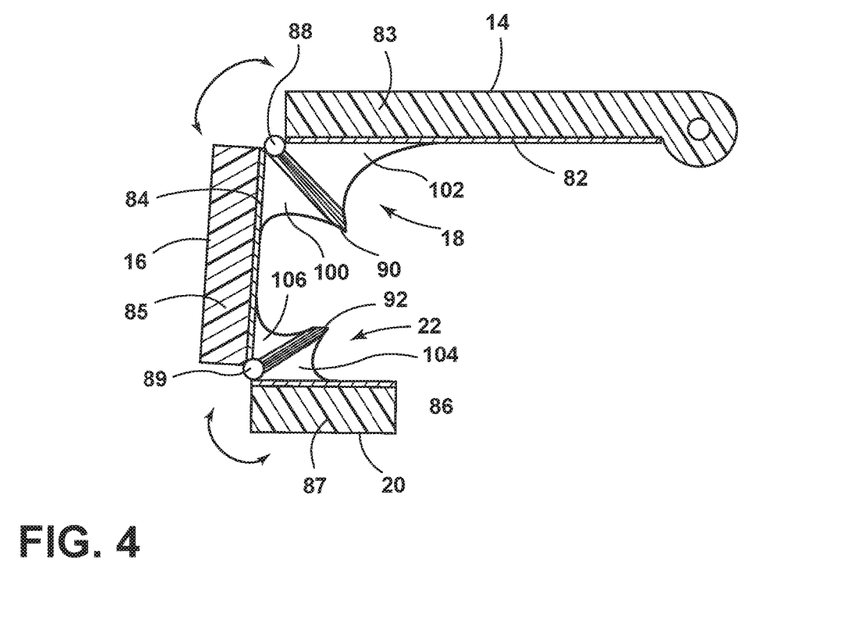
FIG. 4 is a schematic side cross-sectional elevational view of a seating assembly having a calf support and extension in a retracted position.
Figure 5:
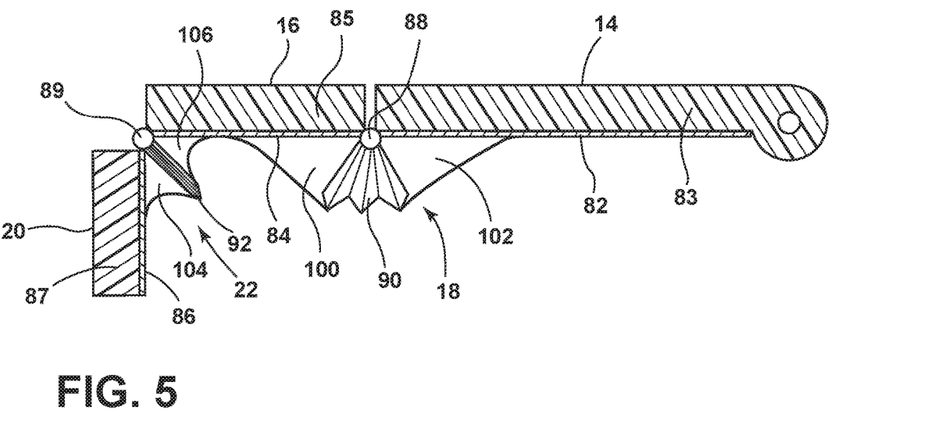
FIG. 5 is a schematic side cross-sectional elevational view of the seating assembly of FIG. 4 with the calf support extended and the extension retracted.

Referring to the embodiment generally illustrated in FIGS. 1-8, reference numeral 10 generally designates a seating assembly that includes a seatback 12. A seat 14 is operably coupled with the seatback 12. A calf support 16 is rotatably coupled with the seat 14. A first bladder assembly 18 is disposed behind the calf support 16 and is configured to rotate the calf support 16 outward approximately 90 degrees from a design position (FIG. 1) to a deployed position (FIG. 2). An extension 20 is rotatably coupled with the calf support 16. A second bladder assembly 22 is disposed between the calf support 16 and the extension 20 and is configured to rotate the extension 20 from a stored position (FIG. 4) to a support position (FIG. 5).

With reference to FIG. 1, the seating assembly 10 is generally constructed for use in a variety of environments, including residential or commercial applications, as well as in vehicles 28. The seating assembly 10 generally includes a seat base 30 supported on feet 32. The feet 32 may be operably coupled with a floor 34 of the vehicle 28. It will be understood that the feet 32 may be slidably coupled with the floor 34 or may maintain a stationary position relative to the floor 34 of the vehicle 28. The seat base 30 extends upwardly from the feet 32 and is configured to support a suspension assembly 40 and the seat 14. The seat 14 includes a cushion assembly 42 configured to provide comfort to an occupant. In addition, the seat 14 includes a rear portion 44 and a forward portion 46. The forward portion 46 may include two independent calf supports configured to independently support each leg of an occupant.

The seating assembly 10 may include the single calf support 16, as shown in FIG. 2. The seatback 12 is operably coupled with the seat 14 and is configured to pivot relative to the seat 14. In addition, the seatback 12 may include one or more seatback arms 50 pivotally coupled with the seatback 12. The seatback arms 50 are generally configured to provide support to the arms of an occupant. The seatback 12 includes a lower lumbar cushion 52 and an upper thoracic cushion 54. The upper thoracic cushion 54 may be configured to rotate relative to the seatback 12. The seatback 12 also includes side bolsters 56 configured to cradle the sides of an occupant. A head restraint 60 is disposed on the seatback 12 and is operable between a plurality of vertical positions relative to the seatback 12.

Referring again to FIGS. 1 and 2, the seating assembly 10 is generally configured to provide sleeping accommodations to an occupant. Accordingly, the seatback 12 is configured to pivot rearward relative to the seat 14, such that the seat 14 and the seatback 12 are aligned or nearly aligned (FIG. 2). In this configuration, the seating assembly 10 can provide comfort to an occupant that wishes to rest or sleep for a period of time without leaving the safety of the vehicle 28. In an effort to provide increased comfort and support to the upper back of an occupant, the upper thoracic cushion 54 can rotate upward (forward) into abutting contact with an upper portion of the back of an occupant. This additional support lessens strain on the head and neck of the occupant.

With reference now to FIGS. 2 and 3, a mechanically driven version of the seating assembly 10 is illustrated. Here, the calf support 16 of the seating assembly 10 is operable between the design position (FIG. 1) and the deployed position (FIG. 2). It will be understood that the calf support 16 may rotate via any number of hinge assemblies 70 that couple the calf support 16 with the seat base 30. In addition, it is generally contemplated that the calf support 16 may rotate to a mid-position between the design position and the deployed position, as desired by an occupant. In the illustrated embodiment, the calf support 16 includes a motorized assembly 72 with a support member 74 that is moveable relative to a calf support motor 76. The calf support 16 may be slidably coupled to the extendable support with side sliders. It is generally contemplated that the calf support motor 76 may also be engaged with the support member 74 via a screw type mechanism, pneumatic mechanism, etc. However, the calf support 16 may also be deployable based on tension or compression springs of the seating assembly 10. The calf support 16 may be moved based on a user actuating a mechanical release, an electrical switch coupled with the motor 76, etc. Alternatively, the calf support 16 may move automatically, based on a preset position desired by a user. The extension 20, which generally defines an extendable support, is moveable between extended and retracted positions.

In the illustrated embodiment of FIG. 3, the extension 20 is fully extended such that the lower legs or feet of an occupant can be supported on the extension 20. An extension motor 78 disposed below the calf support 16 is configured to extend an extension support 80 between forward and rearward positions, thereby moving the extension 20 between the extended and retracted positions. When fully extended, it is generally contemplated that the extension 20 may be rotatable about a pivot bar 81 defining a pivot axis disposed at a junction of the distal end of the calf support 16 and a proximal end of the extension 20. It will also be understood that the calf support 16 will not move to the design position until the extension 20 has been at least partially retracted. This is so that the extension 20 does not accidentally strike the floor 34 of the vehicle 28, potentially creating damage to the mechanism or the seating assembly 10 as a whole. It will be understood that user preferences may be maintained in relation to the various settings and angles and a moderate degree of extension of the calf support 16 as well as the extension 20. Also, the extension 20 may be substantially parallel with the calf support 16 when in the stored position.

With reference now to FIGS. 4-7, a fluid driven version of the seating assembly 10 is illustrated. Here, a schematic view of the seat base 30, the calf supports 16, and the extension 20 is shown with the calf support 16 rotatably coupled with the seat base 30 and moveable relative to the seat base 30 via expansion of the first bladder assembly 18. The seat base 30 includes a frame 82 with a cushion support 83. The calf support 16 includes a frame 84 with a cushion support 85. The extension 20 includes a frame 86 with a cushion support 87. A hinge 88 is disposed between the frame 82 and the frame 84. A hinge 89 is disposed between the frame 84 and the frame 86. The first bladder assembly 18 may include one large bladder 90 to move the extension 20 between the design position (FIG. 4) and the deployed position (FIG. 5). The second bladder assembly 22 includes a smaller bladder 92 that may be in fluid communication with the first bladder assembly 18 or may be a stand-alone bladder that is not in fluid communication with the first bladder assembly 18. Regardless, the first and second bladder assemblies 18, 22 are configured to move the calf support 16 and the extension 20 between the design position and the deployed position, as shown in FIGS. 4 and 5.

With reference again to FIGS. 4 and 5, the first bladder assembly 18 includes a forward web 100 and a rearward web 102. The forward web 100 is disposed below the frame 82 of the calf support 16, which is disposed below the cushion support 83 of the calf support 16. The bladder 90 is disposed between the forward and rearward webs 100, 102. The rearward web 102 is operably coupled with the frame 82 of the seat base 30. When the bladder 90 is collapsed, the calf support 16 is in the design position and generally oriented at approximately a 90 degree angle relative to a planar extent of the seat base 30. When the bladder 90 is fully filled with fluid, the calf support 16 moves to a position generally aligned with a seating surface of the seat 14. In this instance, a seating surface of the cushion support 83 of the seat base 30 and a seating surface of the cushion support 85 of the calf support 16 are aligned or nearly aligned (FIG. 5).

Figure 6:
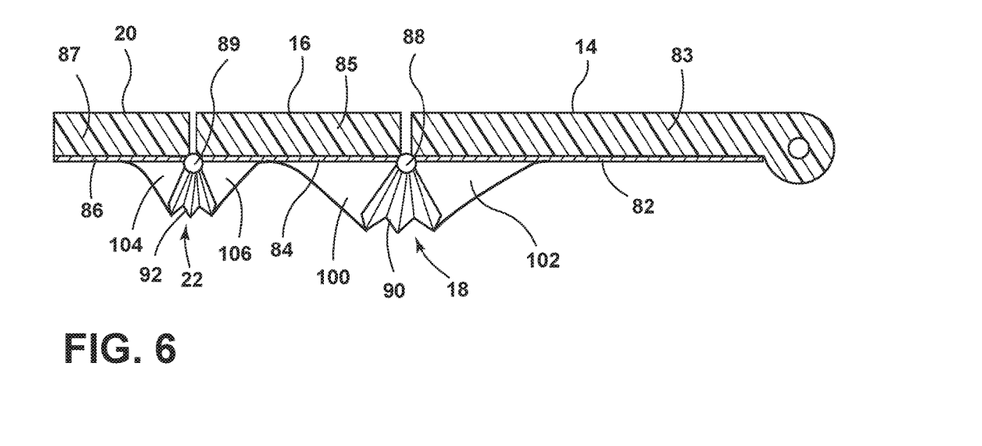
FIG. 6 is a schematic side cross-sectional elevational view of the seating assembly of FIG. 4 with the calf support and extension in an extended position.
Figure 7:
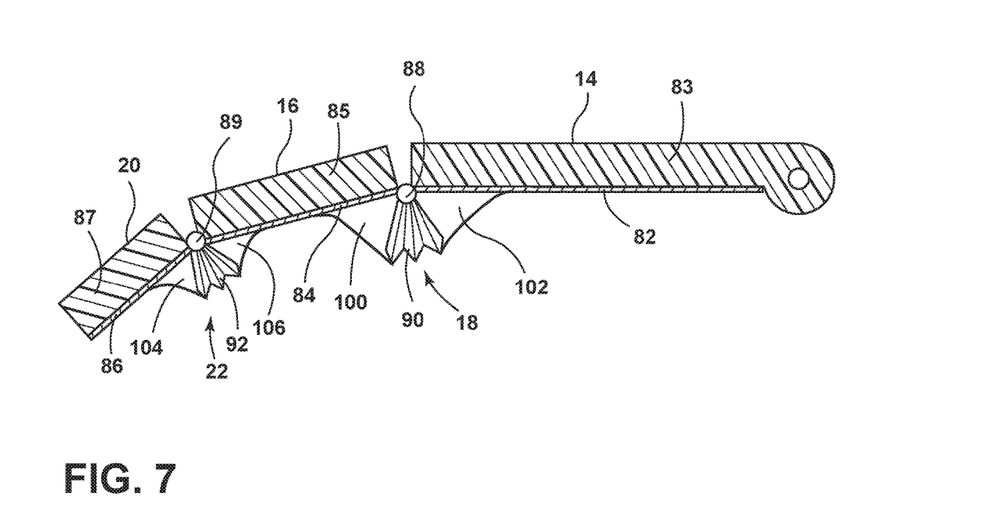
FIG. 7 is a schematic side cross-sectional elevational view of the seating assembly of FIG. 4 with the calf support and extension in a partially extended position.

With reference now to FIG. 6, the extension 20 can be moved into alignment with the seat 14 and the calf support 16 upon activation of the second bladder assembly 22. The bladder 92 is positioned between a forward web 104 and a rearward web 106. The smaller bladder 92 is filled with fluid until a seating surface of the cushion support 87 of the extension 20 is generally aligned with the cushion support 85 of the calf support 16. It will be understood that the calf support 16 and the extension 20, and the bladders 90, 92 associated therewith, may be partially inflated to provide a rounded contour to the seating assembly 10, as shown in FIG. 7. It will also be understood that the bladders 90, 92 may be in fluid communication or may be isolated, such that inflation of the bladders 90, 92 may be conducted independently. Further, it will be understood that the seating assembly 10 may include protocols that prohibit filling the smaller bladder 92 before filling the large bladder 90. This is to minimize the likelihood of the extension 20 striking the floor 34, potentially damaging the floor 34, the seating assembly 10, or both. It will also be understood that this embodiment of the disclosure may include a fair amount of flexibility that is otherwise not available in more rigid mechanical structures. This is as a result of the use of the bladders 90, 92 of the first bladder assembly 18 and the second bladder assembly 22.

Figure 8:
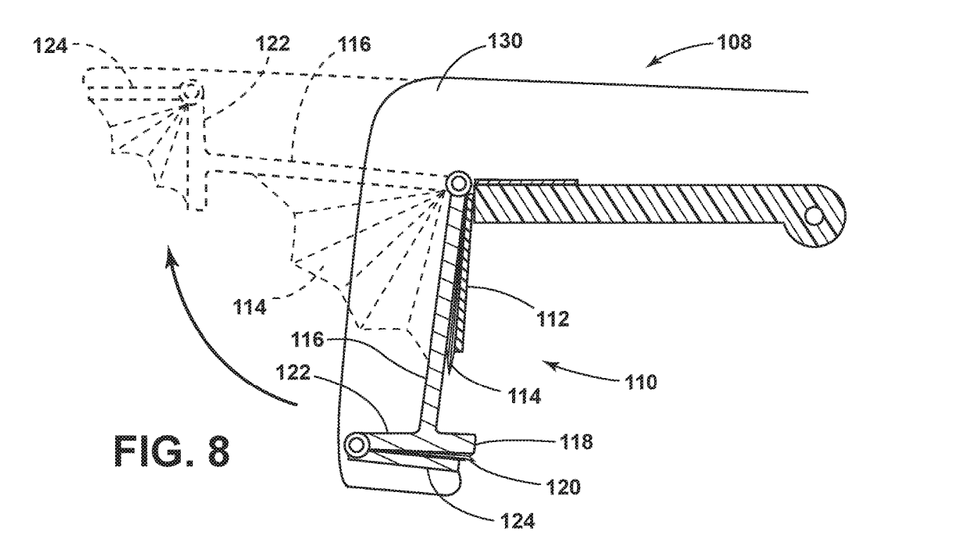
FIG. 8 is an enlarged cross-sectional elevational view of a seating assembly of the present disclosure.

With reference now to FIG. 8, a seating assembly 108 including an alternate dual bladder system 110 is illustrated. A first bladder assembly 112 expands a first bladder 114 approximately 90 degrees to rotate a calf support 116 between a design position and a deployed position. A second bladder assembly 118, which includes a second bladder 120, is also deployable approximately 90 degrees between a fixed wall 122 and a dynamic wall 124 that rotates relative to the fixed wall 122. The dynamic wall 124 is configured to rotate (when the calf support 116 is in the lateral position) upward to a generally lateral position via the second bladder assembly 118. In this embodiment, a single cushion assembly 130 extends over the calf support 116 and the dynamic wall 124. Here, the cushion simply flexes and moves above the dual bladder system 110.

Figure 9:
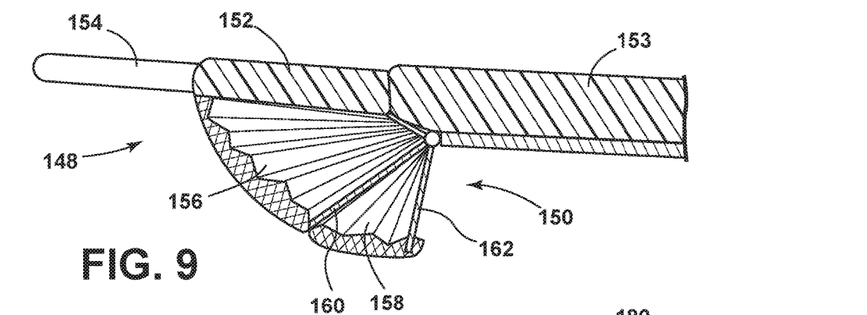
FIG. 9 is an enlarged cross-sectional elevational view of another seating assembly of the present disclosure.

With reference now to FIG. 9, a seating assembly 148 is illustrated. The seating assembly 148 includes a bladder assembly 150 that rotates a calf support 152 between a deployed position and a design position relative to a seat 153. The seating assembly 148 also includes an extension 154, which is telescopically engaged with the calf support 152. The bladder assembly 150 of FIG. 9 includes first and second portions 156, 158, which may be in fluid communication or independently filled with fluid during movement of the calf support 152 relative to the seat 153. First and second rigid supports 160, 162 help space the first and second bladders 90, 92 relative to one another and provide proper rotation of the first and second bladder assemblies 18, 22 so that a seating surface of the calf support 152 can be aligned with the seat 153. The extension 154 is configured to move into an out of the calf support 152. The extension 154 may be configured to move mechanically or via bladders into and out of the calf support 152, and may operate as a function of the calf support 152 or independently.

Figure 10:
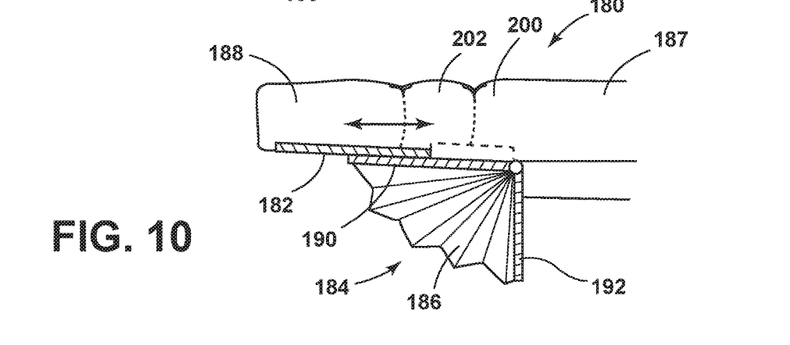
FIG. 10 is an enlarged cross-sectional elevational view of another seating assembly of the present disclosure.

With reference now to FIG. 10, a seating assembly 180 is illustrated. In this instance, a slidable plate 182, which may be mechanically driven, is disposed above a bladder assembly 184 having a bladder 186. The bladder 186 is configured to extend relative to a seat 187 between the extended and retracted positions. At the same time, a calf support 188 is moveable between the deployed and design positions, which are generally laterally and vertically aligned. The slidable plate 182 moves above a rotatable plate 190. The rotatable plate 190 is configured to rotate between zero and 90 degrees relative to a static plate 192 disposed below the seat 187. The bladder 186 is illustrated between the rotatable plate 190 and the static plate 192. In addition, the seating assembly 180 includes a cushion support 200 with a flexible and stretchable cushion 202 that allows for lateral movement of the calf support 188 relative to the seat 187. It will be understood for each of the bladder assemblies set forth herein that the bladders of such bladder assemblies may include pleats or may be elastically stretchable.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those Skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly comprising:
   a seat operably coupled with a seatback and including:
   a calf support rotatably coupled with the seat;
   an extendable support configured to move linearly relative to the calf support; and
   a pivot bar linking a proximal end of the extendable support with a distal end of the calf support, such that the extendable support is rotatable relative to the calf support about a pivot axis disposed at a junction of the distal end of the calf support and the proximal end of the extendable support when the extendable support is fully extended.

2. The seating assembly of claim 1, wherein the extendable support includes a width approximately equal to a width of the seat.

3. The seating assembly of claim 1, wherein the extendable support moves in concert with a rear H-point pivot of the seat.

4. The seating assembly of claim 1, wherein a forward portion of the seat is configured to lower as the calf support moves to a deployed position.

5. The seating assembly of claim 1, wherein the calf support is slidably coupled to the extendable support with side sliders.

6. The seating assembly of claim 1, wherein the calf support is pivotally coupled with a cushion pan of the seat.

7. The seating assembly of claim 1, wherein the extendable support telescopes outwardly automatically as the calf support rotates upward.

* * * * *